United States Patent [19]

Phipps

[11] 4,271,107
[45] Jun. 2, 1981

[54] FOAM EXTRUSION APPARATUS AND METHOD

[75] Inventor: Arthur L. Phipps, Los Osos, Calif.

[73] Assignee: Condec Corporation, Old Greenwich, Conn.

[21] Appl. No.: 91,116

[22] Filed: Nov. 5, 1979

[51] Int. Cl.³ ............................................. B29D 27/00
[52] U.S. Cl. ..................................... 264/51; 264/562;
264/101; 264/178 R; 425/71; 425/817 C;
425/DIG. 60
[58] Field of Search .................... 264/51, 53, 101, 102,
264/178 R, 562; 425/71, 817 C, DIG. 60

[56] References Cited

U.S. PATENT DOCUMENTS

| 1,990,434 | 2/1935 | Kohler | 264/101 X |
| 2,485,857 | 10/1949 | Bower | 264/102 X |
| 3,169,272 | 2/1965 | Maxson | 264/209 X |
| 3,507,004 | 4/1970 | Taleff | 264/102 |
| 3,584,108 | 6/1971 | Nelson et al. | 264/321 X |
| 3,704,083 | 11/1972 | Phipps | 264/101 X |
| 3,822,331 | 7/1974 | Cogliano | 264/51 |
| 4,044,084 | 8/1977 | Phipps | 264/101 X |

FOREIGN PATENT DOCUMENTS 1233088 5/1971 United Kingdom ................... 264/101

*Primary Examiner*—Philip Anderson
*Attorney, Agent, or Firm*—Maky, Renner, Otto & Boisselle

[57] ABSTRACT

An extrusion system for the production of foam boards, billets and the like products includes an extruder (20) at a first higher elevation (22) extruding foamable resin through a die in the upper end of an elongated vacuum chamber in the form of an inclined barometric leg (26) which extends at its lower end into a shallow but large surface area pool (39) of liquid such as water. An elongated shroud or hood (44) on the lower end of the leg reduces the pressure head of water above the foam product as it exits the leg and moves out of the pool for processing at a lower second elevation. The large area of the pool reduces its depth for a given volume and minimizes fluctuations in the level of the pool and the pressure head above the product when the vacuum changes. In one embodiment the pool extends beneath substantially the entire floor of the building (30) enclosing the second lower elevation (31) in which the subsequent processing occurs. In another embodiment the pool (165) extends beneath the leg with the pool also serving as structural footings for the support of the leg and the platform forming the first higher elevation.

47 Claims, 9 Drawing Figures

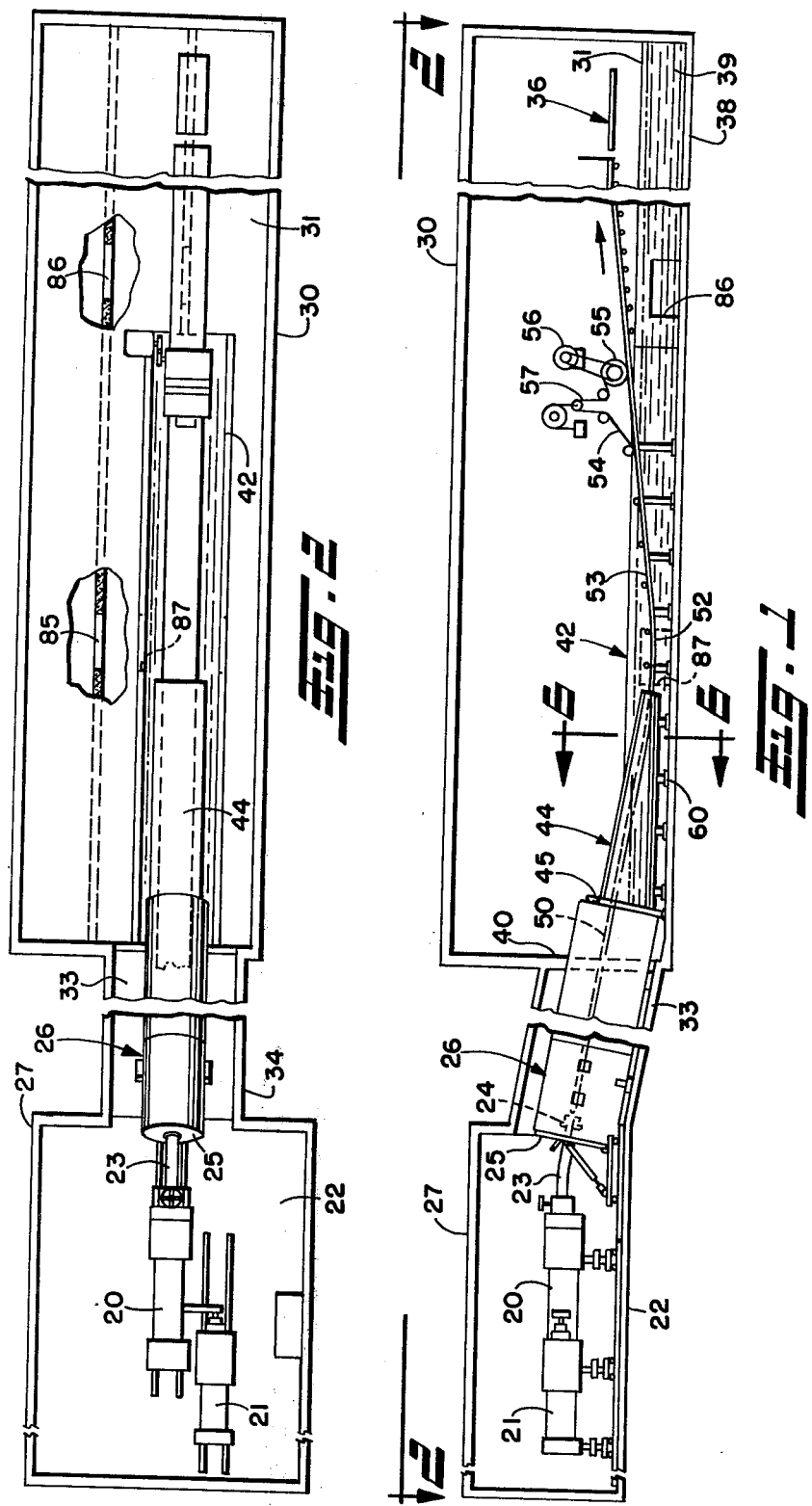

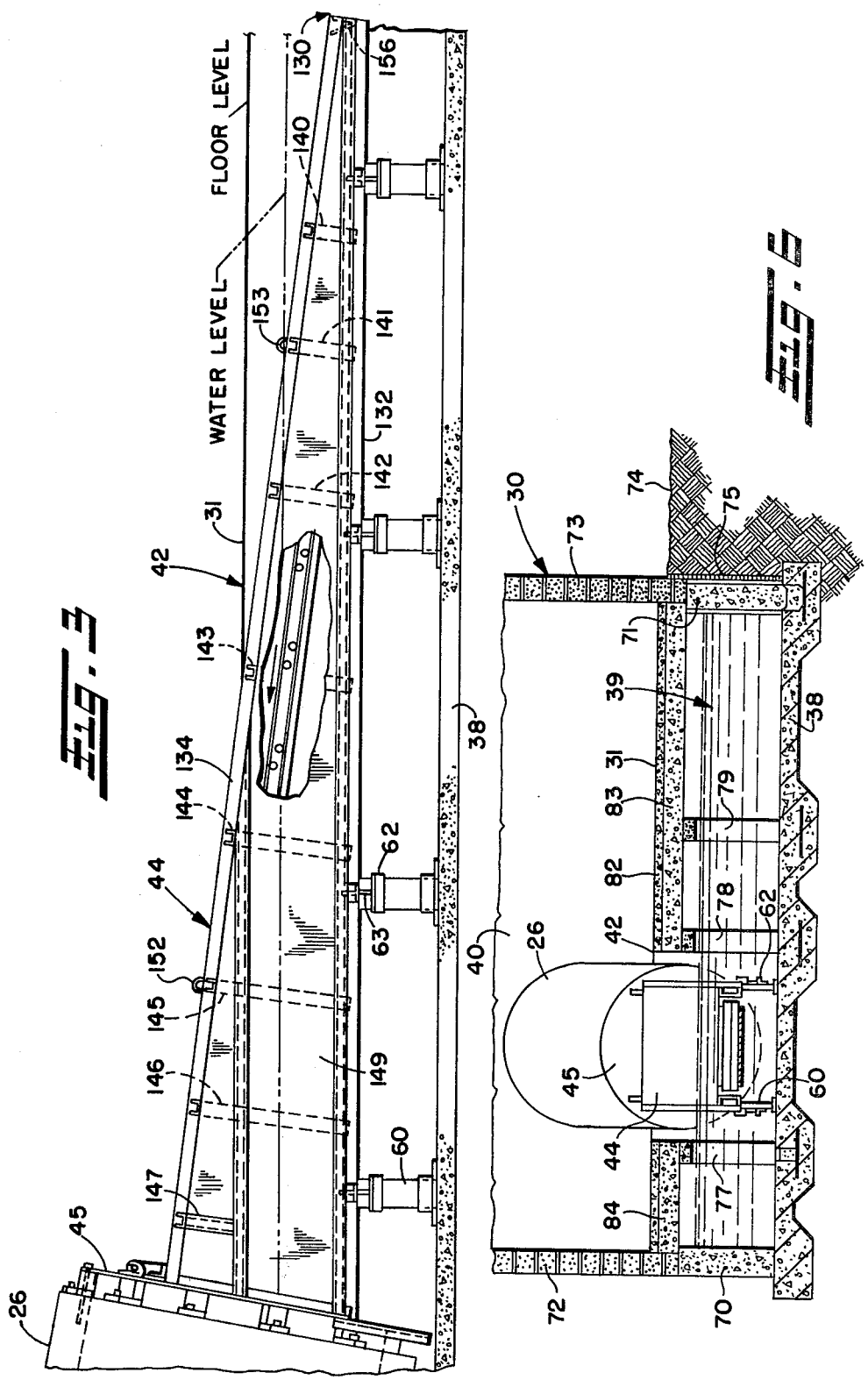

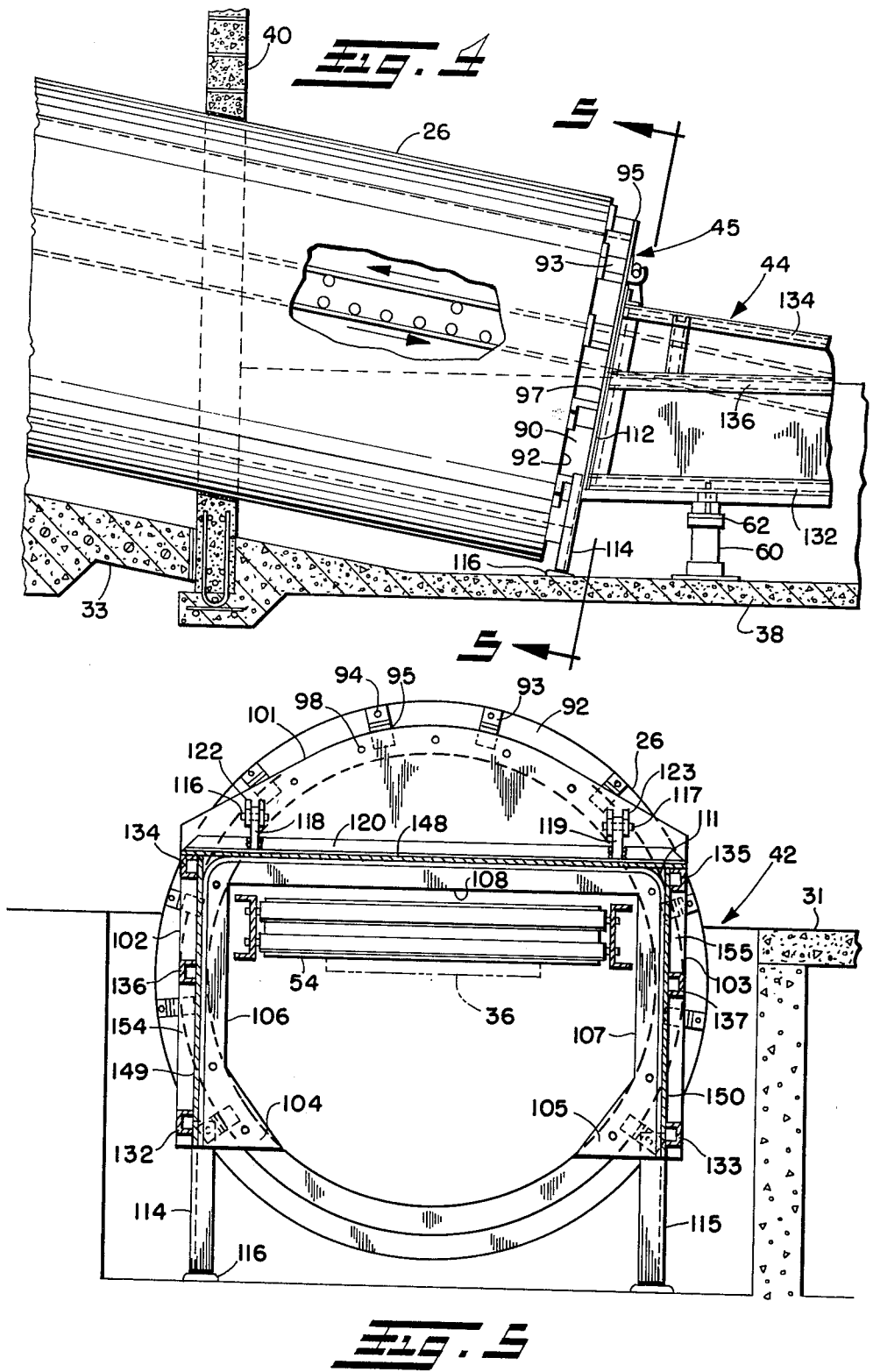

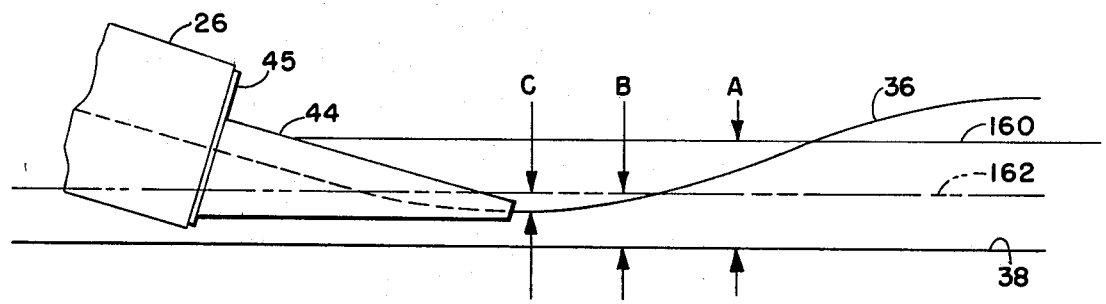
_Fig. 7_
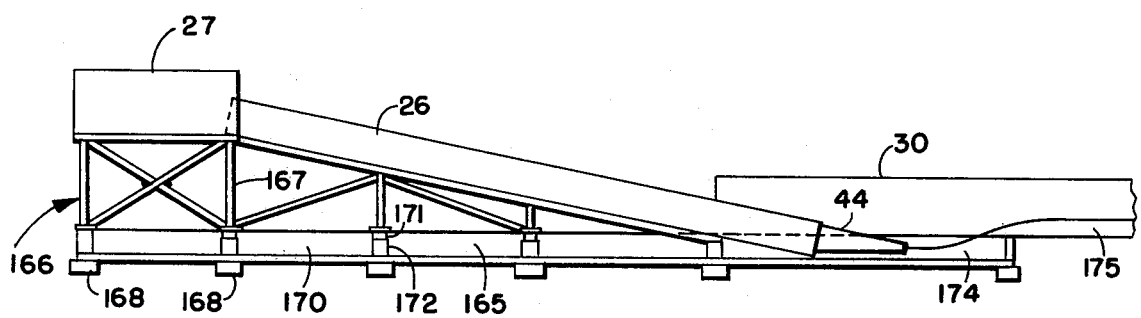
_Fig. 8_
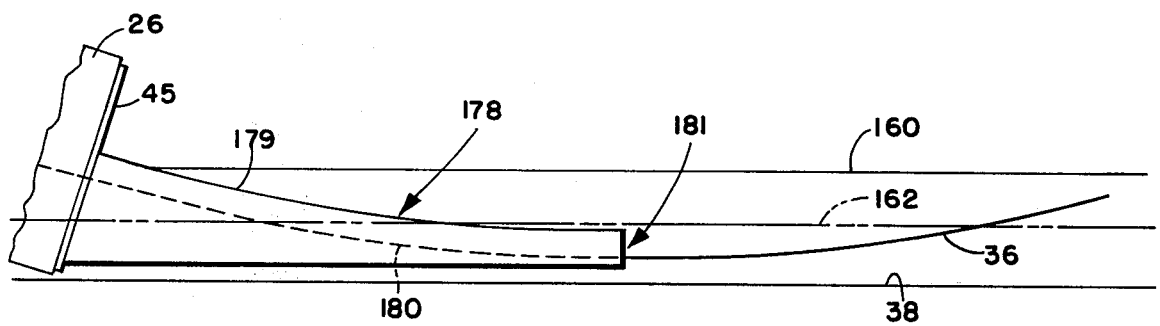
_Fig. 9_

FOAM EXTRUSION APPARATUS AND METHOD

This invention relates generally as indicated to a foam extrusion apparatus and method and more particularly to certain improvements in vacuum foam extrusion technology of the inclined barometric leg type as seen in applicant's prior U.S. Pat. Nos. 3,704,083, 4,044,048, and applicant's copending application for U.S. Letters Pat. Ser. No. 922,541 entitled EXTRUSION APPARATUS AND METHOD filed July 10, 1979.

It is known that the formation of extruded foams in the form of billets or boards is enhanced by the employment of a vacuum chamber so that the expansion of the foam is accomplished under sub-atmospheric pressure. Examples of vacuum foam extrusion apparatus and methods may be seen in prior U.S. patents to Nelson et al U.S. Pat. No. 3,584,108, Maxon U.S. Pat. No. 3,169,272, Cogliano U.S. Pat. No. 3,822,331 and U.K. Pat. No. 1,233,088. In vacuum extrusion technology, a most difficult problem to solve is the curing and extraction of the material from the vacuum chamber. This problem has been solved by the employment of a large radius conveyor system which permits the relatively large cross-sectional area products to exit the vacuum chamber and pool of water at the lower end thereof without undue flexure.

On a small or laboratory scale, the construction and operation of the barometric leg is a relatively simple matter. However, in a large scale plant where substantial volumes are involved, both in the barometric leg and the pool of water at the lower end, a number of problems are encountered.

If the barometric leg is of substantial diameter such as one meter or more, and is of significant length, a substantial volume of water is required to fill the leg when it is under vacuum. When the leg is under vacuum the water is drawn from the pool up into the leg. When the line is shut down and the vacuum is released, the water then must flow back into the pool at the bottom of the leg. The volume of water can of course be increased by increasing the depth of the pool. This, however, creates costly construction problems and if the product exits the lower end of the barometric leg or vacuum chamber under a significant pressure head, the pressure on the product created by the depth of water at the exit end may crush or reduce the cell construction in the product being formed. An excessive pressure head can actually negate some of the advantages obtained by a vacuum extrusion process. It has been found that the pressure head is directly related to the density of the product produced.

Moreover, it is apparent that the lower end of the leg or vacuum chamber must be beneath the water level of the pool into which the product exits both when the chamber is under vacuum and when the vacuum is released.

In applicant's prior copending application, Ser. No. 922,541, filed June 10, 1978, now U.S. Pat. No. 4,199,310 entitled EXTRUSION APPARATUS AND METHOD, this problem was to some extent obviated by the employment of various sectional configurations of the barometric leg or, in the case of a circular section, by the employment of a baffle plate on the lower end thereof.

SUMMARY OF THE INVENTION

In accordance with the present invention, there is provided a large scale foam extrusion plant and process which employs one or more extruders on a first higher elevation extruding foamable resin through a die in the upper end of an elongated vacuum chamber of substantial size, such vacuum chamber being in the form of an inclined barometric leg which extends at its lower end into a shallow but quite large pool of water. An elongated shroud or hood secured and sealed to the lower end of the leg achieves a reduced pressure head of water above the foam product as it exits the leg and moves out of the pool for processing at a lower second elevation.

In one embodiment the shallow pool may extend beneath substantially the entire floor of the building or structure enclosing the second lower elevation in which the subsequent processing of the product occurs. The pool is primarily covered by the floor of the second lower elevation and the pool serves as a footing for the building in which the processing occurs.

In another embodiment, particularly useful in more temperate climates, the pool extends beneath the leg itself and the structure forming the pool may also serve as footings for the support of the leg and the platform forming the first higher elevation. In either case the shallow pool has extended length or width dimensions to provide the necessary volume of water while at the same time providing support or footings for structures forming part of the system. The large surface area shallow pool moreover minimizes changes in the pressure head upon variations in vacuum.

The barometric leg may be constructed of large sections while the shroud or hood may be fabricated from metal and may vary in shape or configuration both to conform to the shallow pool depth involved and to reduce the exit pressure head on the product while accomodating a large radius conveyor guiding the product from the leg through the pool and for subsequent processing.

With minimal exit pressure head, lower product densities may be achieved at a given vacuum resulting in a less costly product. Also, such minimal pressure head can achieve a product of the same density at a lower vacuum resulting in a less costly plant.

It is accordingly a principal object of the present invention to provide a low cost, low density foam product.

It is also an important object to provide a low density product which can be achieved with a less costly plant.

It is a further principal object of the present invention to provide a large scale foam extrusion line of the barometric leg type wherein the pressure head on the product as it exits the leg is minimized.

Another principal object is the provision of such extrusion line wherein the pool at the lower end of the inclined leg is of shallow depth.

Another important object is the provision of such extrusion line wherein the shallow pool serves as footings or supports for other structural aspects of the extrusion line.

Still another object is the provision of such extrusion line which includes a prefabricated readily removable shroud or hood which may be attached to the lower end of the barometric leg significantly to reduce the pressure head on the product exiting the leg while yet accomodating the conveyor system of significant radius.

A further object of the present invention is the provision of such extrusion line wherein the shallow pool extend beneath substantially the entire floor of the structure supporting the equipment in which subsequent processing of the product produced occurs.

Still another object is the provision of such shallow pool supporting the structure in which the pool water may be temperature controlled not only to cool or reduce the temperature of the extrudate passing therethrough but also to assist in controlling the temperature in the building enclosing the process equipment for the extrudate.

A yet further object is the provision of a shallow pool which may extend beneath the leg of the pool also serving as footings for the support of the leg and the platform forming the first higher elevation for extruders.

Yet another object is the provision of a foam extrusion apparatus and method of reduced cost while obtaining an improved product.

Other objects and advantages of the present invention will become apparent as the following description proceeds.

To the accomplishment of the foregoing and related ends of the invention, then comprises the features hereinafter fully described and particularly pointed out in the claims, the following description and the annexed drawings setting forth in detail certain illustrative embodiments of the invention these being indicative, however, of but a few of the various ways in which the principles of the invention may be employed.

BRIEF DESCRIPTION OF THE DRAWINGS

In said annexed drawings:

FIG. 1 is a side elevation of a two-level plant in accordance with the present invention with the two levels being interconnected by the barometric leg, such leg being broken away and greatly forshortened, with the shallow pool into which the barometric leg extends, extending substantially entirely beneath and supporting the structure at the lower end of the leg;

FIG. 2 is a top plan view broken away of the two-level plant as seen in FIG. 1;

FIG. 3 is an enlarged side elevation of the shroud or hood removably connected to the lower end of the leg within the shallow pool;

FIG. 4 is an enlarged frgmentary side elevation with the pool structure shown in section illustrating the connection of the shroud or hood to the seal plate connected to the lower end of the leg;

FIG. 5 is a transverse section taken substantially through the end of the hood adjacent the leg as seen from the line 5—5 of FIG. 4 illustrating both the hood and the seal plate in position;

FIG. 6 is a transverse section through the structure at the lower end of the leg as seen from the line 6—6 of FIG. 1 illustrating the manner in which the pool extends substantially entirely beneath the floor of the building at the lower end;

FIG. 7 is a schematic illustration of the pool, the lower end of the barometric leg and the shroud or hood illustrating the water level when the leg is not under vacuum, the water level when the leg is under vacuum, and the reduced pressure head on the product as it exits the pool, when the leg is under vacuum;

FIG. 8 is a side elevation with the pool and footings shown in section of an embodiment of the invention wherein the pool, rather than extending entirely beneath the building at the lower end of the leg, extends substantially vertically beneath the leg supporting both the leg and the building at the upper elevation on an elevated trestle or similar structure; and FIG. 9 is a side elevation similar to FIG. 7 of another form of hood or shroud which may be employed to accomodate the large radius conveyor, the upper edge of the shroud being accuate in form and struck from the same center as the conveyor.

DESCRIPTION OF THE ILLUSTRATED EMBODIMENTS

Referring first to FIGS. 1 and 2 and the embodiment there illustrated, it will be seen that the foam extrusion apparatus and method of the present invention employs dual extruders 20 and 21 supported at a first higher elevation 22 which produces a homogenous melt which is extruded through pipe 23 to die 24. The pipe extends through a bulkhead 25 which closes the upper end of elongated vacuum chamber or barometric leg 26. The extruders and the upper end of the leg may be enclosed as in a building or structure seen at 27 at such first higher elevation 22.

A second structure 30 positioned at the lower end of the vacuum chamber 26 has a floor 31 which may be termed a second lower elevation. The vacuum chamber 26 as in the form of an elongated barometric leg which extends from the first higher elevation 22 to the second lower elevation 31. The two elevations 22 and 31 may be approximately 3–15 meters vertically separated and the leg may be approximately 20–70 meters in length. The leg may extend at an angle of approximately 7° to 20° to the horizontal and extend along an inclined support ramp 33 enclosed in housing 34.

Reference may be had to applicant's copending application Ser. No. 922,541 entitled EXTRUSION APPARATUS AND METHOD, filed July 10, 1978 for a more complete disclosure of several constructional forms the barometric leg 26 may take.

The second lower building 30 is substantially larger than the upper building 27 since subsequent processing of the extruded product seen at 36 takes place in such lower building. The product may, for example, be a foam board or billet and such subsequent processing would include cutting, trimming, tongue and grooving or other fabrication requirements prior to inventory and shipping. The elevation 31 is the working floor of the building 30. The building, however, includes a rather shallow subfloor or slab 38 which forms with the floor 31 a rather shallow water chamber or pool 39 which extends substantially entirely beneath the floor 31 within the confines of the structure 30.

The lower end of the pipe or barometric leg 26 extends from the ramp housing 34 through the wall 40 of the structure 30 and into an opening or trench 42 in the second lower elevation or floor 31. The pipe or leg 26 may be approximately 2 meters in diameter or larger while the pool or chamber 39 for the liquid is approximately only 1 meter in depth. Accordingly, approximately half of the lower end of the leg extends above the floor level 31 which is of course somewhat above the level of water in the pool or chamber 39, even when the leg is not under vacuum.

In order to bring the exit of the pipe below the level of the pool 39 even when the pipe or leg is under vacuum, and also to reduce the pressure head on the extrudate as it exits the leg, there is provided a transition hood or shroud on the lower end of the leg within the opening 42 as seen at 44.

The shroud or hood is somewhat wedge-shape as seen in FIG. 1 in side elevation and is connected to an inverted U-shape seal plate 45 seen in greater detail in FIGS. 3, 4 and 5.

As seen more clearly in applicant's prior U.S. Pat. No. 4,044,084, the extruded product is supported on the underside of an elongated conveyor 50 which extends upwardly into the leg close to its upper end. The buoyancy of the foam product maintains the product against the underside of the belt of the conveyor and the relatively shallow angle of the leg and the conveyor obtains purchase or frictional engagement between the product and the conveyor belt to convey the product downwardly through the leg and out of the pool 39 at the lower end. To get the product out of the pool at the lower end without unduly distorting the product, the conveyor moves through a very large radius arc as indicated at 52 and exits the pool at approximately 53 in FIG. 1. The belt 54 of the conveyor is driven by main drive sheave 55 in turn driven by motor 56. The belt in its return path passes through a tensioning device 57. Beyond the pool the product is supported on either a roller or belt conveyor as indicated at 58. The latter supports the product on the top thereof while the belt 54 supports the product beneath the lower flight of the belt with the product being held thereagainst by the normal buoyancy of the product.

In the pool 39, the conveyor is supported by spaced stanchions 60 some of which may also serve adjustably to support the hood 44. Secured to the exterior of each of the four stanchions illustrated at the entrance end of the pool are angle brackets 62 from which threaded studs 63 project to which threaded nuts and washers may be secured on which the lower peripheral frame of the hood is adjustably supported.

Referring now additionally to FIGS. 4 and 6, it will be seen that the pool 39 is formed from the footings or foundation structure for the building 30. For example, the rectangular building includes the foundation slab 38 which is the lower wall of the pool. The foundation slab may be enlarged as indicated to provide footings for the sidewalls 70 and 71 of the pool which also serve to support the sidewalls 72 and 73 of the building, the latter being formed of a concrete block construction, for example. The bottom slab and sidewalls of the pool may be poured reinforced concrete. As seen in FIG. 6 the sidewall 71 may be below grade 74 with a suitable insulation board being provided on the exterior of the foundation wall as seen at 75. Such insulation board may, for example, be the product of the apparatus and method of the present invention.

Extending parallel to the side foundation walls 70 and 71 additional walls seen at 77, 78 and 79 may be provided. The walls 77 and 78 form the sidewalls of the opening 42. The lower second elevation or floor 31 may be a relatively thin poured concrete floor as indicated at 82 on top of precast concrete slabs 83 and 84. It is noted that the walls 77, 78 and 79 are provided with large windows or openings as seen at 85, 86 and 87 in FIGS. 1, 2 and 6 so that the water of the pool may flow throughout the chamber formed between the floor 31 and the bottom slab 38. The windows are, of course, large enough to permit access for periodic cleaning.

Turning now to the construction of the seal plate and hood, and referring first to FIGS. 4 and 5, if the pipe or barometric leg 26 is formed of pipe sections such as large diameter reinforced concrete sections, each section will have a bell on one end and a spigot on the other to facilitate connection as shown in applicant's aforementioned copending U.S. application. Accordingly, the lower most section of the pipe may be provided with a reduced diameter spigot seen generally at 90. Secured to the shoulder 92 inthe O.D. of the pipe formed by the bell 90 are a series of angle brackets 93. The angle brackets may be secured to the shoulder by threaded dowels or fasteners 94 injected with non-shrink epoxy grout. The angle brackets present a projecting edge or surface flush with the end of the spigot to which the seal plate may be welded as indicated at 95. Once the seal plate is secured to the brackets additional epoxy grout may be applied at the interface between the interior of the seal plate and the projecting bell as indicated at 97. Additional fasteners indicated at 98 may be provided if desired.

The configuration of the seal plate is seen more clearly in FIG. 5 and includes a top arch edge 101 terminating at vertical side edges 102 and 103. The lower end of each side edge is formed into a triangular gusset as seen at 104 and 105, respectively. From the gusset the edge configuration of the plate extends upwardly at 106 and 107 respectively forming the inside of the side legs of the plate with the edges 106 and 107 being interconnected by a top lower edge 108.

The side of the plate opposite the pipe is provided with a projecting relatively short bar 110 in an inverted U-shape configuration. The projecting bar may be employed to guide and support the pipe end of the shroud or hood 44 during installation and may also be employed to support an inflatable seal between the end of the shroud 44 and the plate 45 as indicated at 112 in FIG. 4.

The plate 45 is also provided on the side remote from the shroud with two supporting legs seen at 114 and 115 which may be used both to support the plate 45 during assembly with the pipe or leg and also to assist in supporting both the plate and shroud during operation of the system. When the barometric leg is under vacuum and the shroud is full of water, it will be of substantial weight. As indicated, shims or wedges seen at 116 may be employed beneath the legs 114 and 115 and the top of the bottom slab 38.

In addition to the shelf provided by the projecting bar 110, the shroud may also be supported on the seal plate 45 by the pivot pins seen at 116 and 117 in FIG. 5 which project laterally from ears 118 and 119, respectively, secured to angle frame member 120 on the upper pipe end of the shroud. The pins are supported in paired hooks 122 and 123 secured to the face of the seal plate 45.

The shroud itself is fabricated from metal and may be of the generally wedge-shape configuration seen more clearly in FIG. 3. The top of the shroud may be normal to the seal plate 45 or end face of the barometric leg while the bottom of the shroud is generally parallel to the bottom of the pool. The shroud tapers to a relatively vertically shallow opening at its downstream end as seen at 130 and such opening is the exit of the product from the barometric leg. As such point the product will go from a slightly below atmospheric pressure to a slightly higher than atmospheric pressure, such pressure depending upon the pressure head of water above the product at the exit point.

The shroud is fabricated with channel shape longitudinal frame members 132 and 133 at its lower edge. Similar longitudinal frame members are provided at the upper edge as seen at 134 and 135. Additional horizontal longitudinal frame members may be provided on each side of the shroud near the upper or pipe end as seen at 136 and 137.

The shroud may also be provided with external transverse reinforcements of the channel shape configuration shown at 140 and 147, each being generally U-shape and extending over the top wall or plate 148 and the side plates 149 and 150. The U-shape transverse frames extend generally normal to the top plate 148. Lifting eyes 152 and 153 may be provided as indicated in FIG. 3. The pipe end of the shroud may be reinforced by angle external reinforcements 154 and 155 joined to the top angle reinforcement 120. The reinforcements illustrated serve to reinforce the plates forming the shroud so that it can resist the forces thereon when it is under vacuum as well as the stresses caused by the substantial weight of the water within the shroud when the leg is under vacuum.

The lower or exit end of the shroud may also be provided with a transverse reinforcement as indicated at 156.

The shroud, although of substantial construction, can readily be removed for access to the conveyor therein and also access to the lower end of the leg 26.

Referring now to FIG. 7, there is illustrated three dimensions, A, B, and C which represent respectively the water level or volume when the leg is not under vacuum, the water level or volume when the leg is under vacuum, and finally the pressure head on the product as it exits the shroud and thus the barometric leg. It is of course important to maintain the dimension C at a minimum to reduce the pressure on the product as it exits the leg. It is also important to reduce as far as possible the dimensions A and B. The dimension A is the depth of water in the pool when the barometric leg is not under vacuum. The dimension B is the depth of water when the leg is under vacuum and of course the volume of the water in the barometric leg may be determined by subtracting the volume at the level B from the volume at the level A. The dimension A is taken from the water level 160 when the leg is not under vacuum while dimension B is taken from the level 162 when the leg is under vacuum. It will be appreciated that the level 162 may vary slightly depending upon the extent of the vacuum applied to the upper end of the leg. Because of the presence of the conveyor supporting the workpiece 36, the dimension C cannot be reduced to 0, but because of the employment of the shroud 44 it can be minimized.

As indicated, it is desirable to have as shallow a pool as possible, and this means having a pool with as large surface area as feasible. For a rectangular pool the volume is L (length) W (width) D (depth). Then, as LW (surface area) approaches infinity, the depth D approaches 0 for a given volume. Therefore as LW approaches infinity, changes in the pressure head C approach 0 upon changes in the vacuum in the leg. With the large area shallow pool it is possible to minimize changes in the pressure head C when the vacuum changes.

Referring now to FIG. 8, there is illustrated an embodiment of the present invention wherein the pool 165 for the barometric leg does not extend entirely beneath the lower building 30 but rather extends longitudinally of and beneath the leg 26. Both the upper building and the leg itself may be supported on a trestle or elevated structure seen at 166 and the major bents of such structure seen at 167 may be supported on footings 168 which also support the bottom slab 169 of the pool as well as the side and transverse walls seen at 170 and 171, respectively. Such transverse walls may be provided with windows or openings 172 to permit water to flow uniformly throughout the length of the pool 165. In any event, the height dimensions A, B, and C seen in FIG. 7 would also apply to FIG. 8. However, the length and width dimensions forming the volumes of liquid would change although the volumes may of course be the same. In such embodiment, the pool does not extend entirely beneath the relatively large lower processing building 30 but simply forms as a continuation of the pool a trench 174 in the floor 175 of the building 30. In the embodiment of FIG. 8, the pool serves not only as a shallow containment for the water or liquid necessary for the filling of the barometric leg under vacuum, but also serves as a footing or foundation for the upper building 27 and the barometric leg 26. If desired, the pool 165 may be provided with a non-structural cover simply to keep debris out of the pool and also to reduce evaporation losses.

Referring now to the embodiment of the shroud or hood seen in FIG. 9, it will be appreciated that the radius of curvature of the conveyor belt 54 as it exits the leg is important to reduce the flexure of the product as it exits the leg and pool. Relatively thin boards or billets may be flexed substantially while relatively thicker boards or billets cannot. Thus, for thicker boards or billets a radius of curvature of the conveyor should be substantial. In such instance, the shroud may be provided with a top surface configuration following the radius of curvature of the conveyor. In the embodiment of FIG. 1, for example, the curvature 52 of the belt and thus the product may have a tangent point with the conveyor in the leg approximately 1 meter beyond the seal plate 45. For a larger radius of curvature, the tangent point may be at the seal plate or actually slightly inside the end of leg 26. In such situation, the top of the shroud 178 may be provided with a curved top surface seen at 179 having substantially the same center as the large radius of curvature of the conveyor seen at 180. The exit of the shroud seen at 181 will then be substantially vertically beneath the center of curvature of the conveyor, workpiece, and top surface of the shroud.

It will be appreciated that by controlling the temperature of the water or liquid in the pool that the temperature both in the leg and in the lower building 30 may also be controlled both directly and indirectly. For example, the pool water may also be used as process water for cooling extruder screws or jackets as well as for other purposes. The water may be run through chillers and the BTUs produced by such chillers may be used to heat the buildings in question.

It can now be seen that with the present invention, the shallow pool in combination with the shroud or hood reduces the pressure head of water above the foam product as it exits the leg and moves out of the pool for processing at the second lower elevation. The construction of the pool may be such either to support substantially the entire lower building in which the processing occurs or the vacuum chamber or barometric leg and the upper building, or parts thereof.

With the reduced pressure head it is then possible to produce a product of reduced density, or to produce a product of the same density as prior art legs but with reduced capital investment since less vacuum, leg length, size, etc. is then desired. It follows that a product with lower density requires less raw materials which are costly.

It should be noted that a pool of substantially uniform depth is preferred. However, it will be noted that the bottom of the pool in the area of the lower end of the leg and conveyor may be somewhat deeper. Thus the A and B dimensions of FIG. 7 may more properly be described as volumetric related elevations rather than vertical depth dimensions.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. In a method of extruding foam products through an inclined barometric leg with the foam product exiting a pool of water at the lower end of such leg, the step of minimizing the pressure head of water on the product as it exits the leg to reduce the density of the product.

2. A method as set forth in claim 1 including the step of minimizing the depth of the pool.

3. A method as set forth in claim 2 including the step of maximizing the surface area of the pool.

4. A method as set forth in claim 1 including the steps of minimizing the depth and maximizing the surface area of the pool.

5. A method as set forth in claim 1 including the step of minimizing changes in the pressure head upon variations in vacuum.

6. A method as set forth in claim 5 wherein said last mentioned step is accomplished by maximizing the surface area of the pool.

7. In a method of extruding foam products through an inclined barometric leg with the foam product exiting a pool of water at the lower end of such leg, the step of minimizing the depth and maximizing the surface area of the pool.

8. A method as set forth in claim 7 including the step of minimizing the pressure head of water on the product as it exits the leg to reduce the density of the product.

9. In a vacuum extrusion system, a barometric leg through which the extrudate passes extending from a first higher elevation to a second lower elevation into a pool of water, and a hood extending from the lower end of said leg through which the extrudate passes reducing the pressure head of water above the extrudate as it exits said leg through the hood into the pool of water.

10. A vacuum extrusion system as set forth in claim 1 wherein said hood is generally wedge shape and abuts at its larger end against the lower end of said leg.

11. A vacuum extrusion system as set forth in claim 10 wherein said hood is fabricated and is sealed to the lower end of said leg.

12. A vacuum extrusion system as set forth in claim 11 wherein said pool of water is shallow and said hood is partially submerged in said shallow pool of water.

13. A vacuum extrusion system as set forth in claim 10 wherein said hood includes a vertically narrow horizontal opening at its end opposite the leg.

14. A vacuum extrusion system as set forth in claim 13 including a conveyor extending through said leg and said hood exiting the latter through such narrow opening.

15. A vacuum extrusion system as set forth in claim 14 wherein said conveyor includes a large radius upwardly extending curve with such narrow opening being substantially adjacent the bottom of the curve.

16. A vacuum extrusion system as set forth in claim 15 wherein the hood is elongated and the uper surface thereof is curved at substantially the same radius as the large radius curvature of the conveyor.

17. A vacuum extrusion system as set forth in claim 9 including a seal plate on the lower end of said leg to which said hood is removably connected.

18. A vacuum extrusion system as set forth in claim 17 wherein said hood is elongated axially of the leg and the upper surface thereof extends normal to the seal plate.

19. A vacuum extrusion systemas set forth in claim 9 wherein said hood includes an inclined top wall extending from above the level of the pool to below the level of the pool and terminating in a narrow horizontal opening below the level of the pool.

20. A vacuum extrusion system as set forth in claim 19 wherein said hood includes sidewalls extending from the top wall to below the level of the hood.

21. A vacuum extrusion system as set forth in claim 19 wherein the bottom of the pool of water is horizontal, and the lower edge of the sidewalls of the hood are also horizontal.

22. A vacuum extrusion system as set forth in claim 9 including a structure enclosing the second lower elevation, said shallow pool of water extending substantially beneath at least the entire structure.

23. A vacuum extrusion system as set forth in claim 9 wherein said pool is confined in an elongated structure which extends beneath the barometric leg and serves as a support for said leg.

24. In a vacuum extrusion system comprising an inclined chamber extending from a first higher elevation to a pool of water at a second lower elevation, the improvement comprising an elongated hood on the lower end of said chamber having a vertically narrow horizontal opening into said pool of water near the bottom of such pool.

25. A vacuum extrusion system as set forth in claim 24 wherein said elongation hood comprises a removable shroud partially submerged in such pool.

26. A vacuum extrusion system as set forth in claim 25 wherein said shroud is substantially wedge shape and with the extrudate exiting from the chamber at its narrow end.

27. A vacuum extrusion system as set forth in claim 24 wherein said elongated hood is fabricated and is sealed to the lower end of said chamber.

28. A vacuum extrusion system as set forth in claim 24 including a conveyor extending through said vacuum chamber, said conveyor including a large radius curve to convey the extrudate from the chamber to above the pool of water, the exit end of said hood being substantially at the lowest most point of said curve.

29. A vacuum extrusion system as set forth in claim 28 wherein the top surface of the hood is curved to conform to the conveyor curve.

30. A vacuum extrusion system comprising an inclined elongated vacuum chamber extending from a first higher elevation to a pool of liquid at a second lower elevation through which the extrudate passes, said pool having a first higher liquid level when the chamber is not under vacuum and a second lower liquid level when the chamber is under vacuum, said chamber including an exit opening subjacent said second liquid level, and conveyor means for such extrudate to convey such extrudate upwardly from said exit opening out of said pool of liquid whereby the maximum pressure head on such extrudate is substantially at such exit opening.

31. A vacuum extrusion system as set forth in claim 30 wherein said exit opening is formed in the narrow end of a wedge-shape hood secured to the lower end of said vacuum chamber.

32. A vacuum extrusion system as set forth in claim 31 including a conveyor extending though said vacuum chamber and exiting through said pool of liquid in a large radius upwardly extending curve, said hood forming said exit opening near the lowermost point of said curve.

33. A vacuum extrusion system as set forth in claim 30 wherein said pool is shallow and of substantially uniform depth.

34. A vacuum extrusion system as set forth in claim 33 wherein said elongated vacuum chamber is in the form of a large diameter pipe.

35. A vacuum extrusion system as set forth in claim 34 wherein the depth of said pool is less than the diameter of said pipe.

36. A vacuum extrusion system as set forth in claim 30 including a building for processing said extrudate at said second lower elevation, said pool being relatively shallow and extending substantially entirely beneath said building.

37. A vacuum extrusion system as set forth in claim 36 wherein said pool extends beneath the floor of said building, said floor including an opening in which said exit opening is situated and from which said extrudate passes for processing in said building.

38. In a vacuum extrusion system comprising an inclined barometric leg extending from a first higher elevation to a shallow pool of liquid at a second lower elevation through which the extrudate passes, a building enclosing the lower end of said barometric leg with the structure forming such pool being the foundation of said building.

39. A vacuum extrusion system as set forth in claim 38 wherein said pool is shallow and of uniform depth extending substantially throughout said building and beneath the working floor thereof.

40. A vacuum extrusion system comprising an inclined elongated vacuum chamber extending from a first higher elevation to a pool of liquid at a second lower elevation through which the extrudate passes, said first higher elevation and said elongated vacuum chamber being supported on a trestle-like structure above grade.

41. A vacuum extrusion system as set forth in claim 40 wherein said pool is elongated and extends beneath the vacuum chamber, the structure forming such pool also serving as the foundation for said trestle-like structure.

42. A vacuum extrusion system as set forth in claim 41 wherein said pool extends beneath said first higher elevation supporting the same in like fashion.

43. In a vacuum extrusion system comprising an inclined vacuum chamber extending from a first higher elevation to a shallow pool of water at a second lower elevation, the improvement comprising the pool extending substantially beneath the entire lower elevation.

44. In a vacuum extrusion system comprising an inclined vacuum chamber extending from a first higher elevation to a pool of water at a second lower elevation, the improvement comprising the structure forming such pool extending beneath the inclined vacuum chamber and the first higher elevation substantially to support the same.

45. In a vacuum extrusion system, a barometric leg through which the extrudate passes from a first higher elevation to a second lower elevation into a shallow pool of water, such pool having a large surface area to minimize the change of level of the pool when the leg is placed under vacuum.

46. In a vacuum extrusion system, a barometric leg through which the extrudate passes from a first higher elevation to a second lower elevation into a shallow pool of water, such pool having a large surface area to minimize the change in the pressure head on the extrudate exiting the leg when the leg is under variations in vacuum.

47. In a vacuum extrusion system, a barometric leg through which the extrudate passes from a first higher elevation to a second lower elevation into a shallow pool of water, such pool having a large surface area to minimize changes in the pressure head on the extrudate exiting the leg upon variations in the vacuum.

* * * * *